[54] CREAM WAX AND THE METHOD OF PREPARATION THEREOF

[76] Inventor: Paul Snellgrove, First Presbyterian Church, P.O. Box 507, Lake Providence, La. 02901

[22] Filed: July 22, 1974

[21] Appl. No.: 490,853

[52] U.S. Cl. .................................... 106/245; 106/9; 106/10; 106/11; 106/265; 106/268; 106/271; 252/311; 252/358
[51] Int. Cl.² ...................... C08J 3/02; C08L 91/00; C08L 91/06; C09D 3/387
[58] Field of Search ............... 106/8, 9, 10, 11, 271, 106/245, 265, 268; 252/311, 358

[56] References Cited
UNITED STATES PATENTS

| | | | |
|---|---|---|---|
| 350,550 | 10/1886 | Neuer | 106/245 |
| 1,196,508 | 8/1916 | Bernitz | 106/9 |
| 2,907,664 | 10/1959 | Schoenholz et al. | 106/10 |

OTHER PUBLICATIONS

Warth, *The Chemistry and Technology of Waxes*, 2nd Ed., N.Y. Reinhold Publishing Corporation, 1956, pp. 848–849, TP670W25, 1956.

*Primary Examiner*—Joan E. Welcome
*Attorney, Agent, or Firm*—Watson, Cole, Grindle & Watson

[57] ABSTRACT

A cream wax is produced by forming a mixture of beeswax, paraffin wax and turpentine and heating the mixture to a temperature of approximately 120° F. Linseed oil is heated to the same temperature and then mixed with the above ingredients while maintaining the mixture at that temperature. Naphtha is heated to approximately 110° F. and added to the previous mixture, the temperature of which has been reduced to approximately 110° F. Water and soap are mixed together and heated to approximately 130° F., the heat is removed from the previous mixture and the water and soap mixture added thereto. The aforesaid mixing steps are all accompanied by agitation of the already formed mixture to which the new ingredients are added. The percentage composition by weight of the ingredients to the total composition is as follows: beeswax 8%; paraffin wax and soap 2.4%, turpentine 16%, linseed oil 8%, water 20%, and naphtha 43.2%. The resultant total mixture throughout is allowed to set at ambient temperature for approximately 48 hours and then agitated for approximately one hour. The total mixture is then heated to approximately 110° F. and slowly agitated and maintained at that temperature while it is placed in suitable containers.

2 Claims, No Drawings

CREAM WAX AND THE METHOD OF PREPARATION THEREOF

BACKGROUND OF THE INVENTION

This invention relates to compositions, commonly referred to as cream waxes, and a method for manufacturing such cream waxes. Cream waxes are used to preserve, maintain, and restore new and old finishes on wood products, such as furniture. They are desirable because they reduce fading and do not have a propensity to chip or crack.

SUMMARY OF THE INVENTION

The inventive cream wax is composed of beeswax, paraffin wax, soap, turpentine, linseed oil, water and naphtha, which are combined in a particular series of steps to provide a greatly improved cream wax which may be used as a protective wax coating on furniture and other wood products that have finishes considered to be in relatively good condition. The cream wax may also be used to dust furniture or as a final finish on furniture and other wood products to provide a protective surface thereover. Additionally, the cream wax may be used to restore old and dull finishes on furniture, such as antique furniture, and other wood products.

The beeswax, paraffin wax and turpentine are melted in a suitable container and mixed while heating slowly to a specified temperature. The linseed oil is then heated and mixed with the mixture of the beeswax, paraffin wax and turpentine with the temperature of the linseed oil at substantially the same temperature as the mixture. The naphtha is heated to a lower temperature than the mixture and the container holding the previous mixture is reduced to the temperature of the naphtha and the naphtha mixed in the container as the container is heated. The ingredients are slowly agitated while being held at a specified temperature. The water and soap is then mixed and heated to a higher temperature than the mixture. The heat is removed from the container holding the previously mixed components and the water and soap are very slowly mixed with the ingredients under slow agitation. The mixture is allowed to set for a specified period of time without being heated and subsequent to that time is agitated at a high speed. The mixture is then again heated to a specified temperature while being slowly agitated, then the temperature is reduced and the mixture agitated for a specified period of time. The mixture is kept at a specified temperature as it is being bottled.

OBJECTS OF THE INVENTION

It is a primary object of this invention to provide an improved cream wax which is easy to use on wood products.

It is another object of the invention to provide an improved cream wax which is easy to use for the preservation, maintenance and restoration of new and old finishes on furniture and other wood products.

It is yet another object of this invention to provide an improved cream wax that is not subject to fading, chipping or cracking.

It is a further object of the present invention to provide a method for the manufacture of a cream wax.

DETAILED DESCRIPTION

The ingredients and their relative proportions are indicated in Table I.

TABLE I

| Ingredients | Parts By Weight to the Total Weight of the Cream Wax |
|---|---|
| Beeswax | 8.00 |
| Paraffin Wax | 2.40 |
| Soap | 2.40 |
| Turpentine | 16.00 |
| Linseed oil | 8.00 |
| Water | 20.00 |
| Naphtha | 43.20 |
| | 100.00% |

The cream wax is manufactured in accordance with the following process. The beeswax, paraffin wax, and turpentine are melted and mixed in a suitable container while it is heated slowly to a temperature of 128° F. The mixture is then slowly agitated for approximately 30 minutes and then heated for 12 hours at a temperature of approximately 120° F. The linseed oil is heated to an approximate temperature of 120° F. and then mixed in the container with the previous ingredients while the linseed oil remains heated. The resultant mixture is then agitated slowly for approximately 30 minutes while holding the mixture at a temperature of approximately 120° F.

The naphtha is heated to approximately 110° F., the heat of the container is then reduced to hold the ingredients thereof to a temperature of approximately 110° F. The naphtha is then mixed in the container while it is heated and the resultant mixture is then agitated slowly for approximately 30 minutes while holding the temperature of the container at approximately 110° F.

Water and soap are mixed together and heated to approximately 130° F. The heat to the container holding the previously mixed ingredients is then cut off and the water and soap mixture is then very slowly added to the ingredients of the container while it is slowly agitated. Such agitation is continued for approximately 30 minutes after the mixture of the water and soap with the other ingredients is completed.

The mixture is allowed to set at room temperature for approximately 48 hours. The mixture is then agitated at high speed for approximately 1 hour. The mixture is then heated to approximately 110° F. while it is slowly agitated. The agitation is continued for approximately 30 minutes after the mixture reaches the temperature of approximately 110° F.

The mixture is then placed in suitable containers such as bottles, while it is maintained at a temperature of approximately 110° F.

When the cream wax is used as a protective wax coating on furniture and other wood products that have a finish in a substantially good condition, the wax within the container is shaken before using. A small amount of the cream wax is applied by using a soft toweling or cheesecloth and is rubbed uniformly on the surface. After the entire surface is uniformly covered, a clean toweling or cheesecloth is then used to lightly remove and blend any excess wax.

When the cream wax is used for dusting furniture it is again shaken before being applied to a cloth or soft toweling which has been wet with warm water and the excess water removed from the cloth. The cream wax is poured on the damp cloth and the wax is worked-in to penetrate the cloth. The excess wax is then wrung out of the cloth which is then rubbed or wiped lightly over the surface to be dusted.

When used as a final finish on furniture and other wood products it is necessary to make sure that all stains, sealers and fillers are dry on the surfaces to be finished. The wax is again well shaken and a uniform, liberal coating of the cream wax is applied to the surface with a soft cloth or soft brush. The surface is allowed to dry for approximately 30 minutes and then it is buffed or polished with a clean cloth or soft brush. The surface may then be further coated to provide a protective wax coating or to remove dust as has been described above.

When used to restore old and dull finishes on furniture, such as antique furniture, or other wood products, the wax is first shaken in the container. A liberal coating of the wax is applied on the surface to be restored. The cream wax is uniformly scrubbed onto the surface by a cheesecloth, stiff bristle brush or "OOO" fine steel wool. Steel wool is preferably used only on surfaces which are severely degraded and when using steel wool it is necessary that the rubbing be applied only along the grain of the wood. The surface is wiped clean of all excess dirt and wax. The surface is inspected and if dirt still remains thereon, it is necessary to repeat the above application and scrubbing of the cream wax. After the surface has been sufficiently scrubbed and cleaned, it is allowed to dry for approximately 30 minutes subsequent to which it is then buffed with a soft cloth. The surface is then provided with a protective wax coating as indicated above.

What is claimed is:

1. A method for the preparation of cream waxes, comprising the steps of:

melting and mixing beeswax, paraffin wax and turpentine in the percentages by weight to the total weight of the cream wax of substantially 8%, substantially 2.4% and 16%, respectively, at a temperature of approximately 128° F.;

adding substantially 8% heated linseed oil by weight to the total weight of cream wax to said mixture at an approximate temperature of 120° F.;

adding substantially 43.2% naphtha by weight to the total weight of cream wax to said mixture at a reduced temperature;

mixing substantially 20% water and substantially 2.4% soap by weight to the total weight of cream wax at a temperature of approximately 130° F. and adding the water and soap mixture to the previously formed mixture at ambient temperature; and agitating and heating the mixture to approximately 110° F.

2. A method as in claim 1 wherein the mixture of said beeswax, paraffin wax and turpentine is agitated for approximately 30 minutes and then heated for approximately 12 hours at a temperature of approximately 120° F.;

agitating the mixture of beeswax, paraffin wax, turpentine and linseed oil for approximately 30 minutes and maintaining the temperature of said mixture at approximately 120° F.;

agitating the mixture of beeswax, paraffin wax, turpentine, linseed oil and naphtha approximately 30 minutes and maintaining the temperature thereof at approximately 110° F.;

removing the heat from the mixture of beeswax, paraffin wax, turpentine, linseed oil, and naphtha while adding said mixture of water and soap, and agitating the resultant mixture for approximately 30 minutes subsequent to the addition of water and soap thereto;

maintaining the total mixture at an ambient temperature for approximately 48 hours, agitating the mixture for approximately one hour and subsequently heating the total mixture to approximately 110° F., agitating the total mixture for approximately 30 minutes after it has attained a temperature of approximately 110° F.; and maintaining the total mixture at a temperature of approximately 110° F. while it is placed in suitable containers.

* * * * *